(No Model.)

C. L. PASSMORE.
HARNESS.

No. 503,725. Patented Aug. 22, 1893.

Witnesses
C. C. Burdine
J. F. Cleary

Inventor
Charles L. Passmore
per John G. Manahan
his Attorney

UNITED STATES PATENT OFFICE.

CHARLES L. PASSMORE, OF ERIE, ASSIGNOR OF ONE-HALF TO EDWIN L. PASSMORE, OF FULTON, ILLINOIS.

HARNESS.

SPECIFICATION forming part of Letters Patent No. 503,725, dated August 22, 1893.

Application filed February 3, 1893. Serial No. 460,835. (No model.)

*To all whom it may concern:*

Be it known that I, CHARLES L. PASSMORE, a citizen of the United States, residing at Erie, in the county of Whiteside and State of Illinois, have invented certain new and useful Improvements in Devices for Improving the Gait and Increasing the Speed of Horses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to the employment of a spring, through the medium of a suitable cord, rope or strap, to assist a horse in throwing forward his front feet, and thereby lengthening, and also regulating, the step.

It is a well-known fact that a frequent defect in the gaits of horses consists in an awkward or improper handling of their front legs, it being an axiom among horsemen that defective movements of the front legs of a horse is an insuperable objection, and, in itself, permanently depreciates the value of the animal as a roadster.

My invention is capable of use in forms somewhat variant from that shown in this application, and I shall, therefore, merely show herein what I deem to be the most practical form of its application.

The essential factors in my invention are a spring, or springs, suitably attached to the thills, or other fixed portion of the vehicle, retractive cords extending from said spring over suitable supporting pulleys in front of the animal, and attached ultimately to the forward limb of the latter, at, or slightly above, the knee. One form of the arrangement and inter-relation of these parts is shown in the accompanying drawings, in which—

Figure 1:
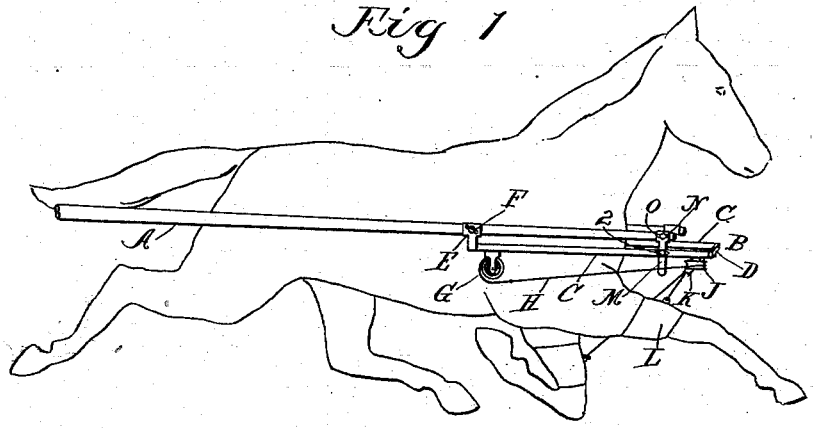
Figure 2:
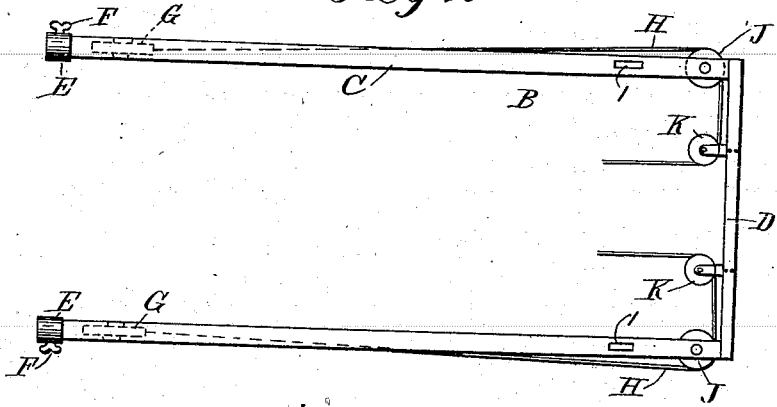
Figure 3:

Figure 1 is a perspective of my invention in place upon the animal. Fig. 2 is a detail in plan. Fig. 3 is a detail of the vertical adjustment at the front end of the thill.

Similar letters and figures refer to similar parts throughout the different views.

A—A are the thills. B is a frame, consisting of the side pieces C—C adapted to be respectively placed under the thills A—A, and suitably connected at their forward ends by the cross-bar D. The rear ends of the plates C are provided with a hook or clasp E, adapted to be clasped over the thills A, respectively, and provided with a set-screw F to hold, and render the same adjustable forward and back on said thill.

Beneath each plate C, and near the rear ends thereof, are attached, respectively, the coiled springs G. A cord H extends from each of the springs G forward and over a pulley J, suitably seated under the forward end of the plate C, and from thence passes over a second pulley K attached to the cross-brace D about directly in front of the fore leg of the animal, and from thence passes backward and is attached to a suitable boot L placed on the fore leg of the animal slightly above the knee. It is understood that this description of the adjustment to the animal's fore leg is equally applicable to the devices at the opposite side of the animal, the operating devices at one side being counterparts of those at the other side.

The frame B is supported at its forward end from the thills A by means of the vertical arm M, attached at its upper end to the forward end of the thill A by means of a metallic box, or sleeve, N placed upon the end of the thill, and held in position by the set-screw O. The pendent arm M is passed through the vertical slot 1 in the plate C, and the latter supported adjustably on arm M by means of a set screw 2.

The purpose of the adjustment just described is to arrange the height of the pulleys J—K to adapt them to horses of different sizes. It may be practical to dispense with one of the last named pulleys, by placing one of them midway the locations of the present two. But the construction shown works very satisfactorily. It may be advantageous to seat pulley K on the bar D in such a way that the pulley may be adjusted laterally.

The advantages of my invention consist in the fact that the gravity of the fore leg of the animal in its downward movement unwinds or stretches the coiled spring G, through the medium of the cord H, and the reaction of the spring, through the medium of said cord, assists the animal in raising his leg at the next movement thereof, and that the effect of the action of the spring is to lengthen the step, the objection in the gaits of horses, in this regard, being that the fore leg is too often raised without being thrown sufficiently forward, thereby shortening the step and decreasing the speed. The effect of the spring is also to draw the leg directly forward and prevent wabbling.

The lifting power, aforesaid, of the spring G, is not only auxiliary to the entire forward movement of the leg, but it is supplemental to the latter part of said movement, by giving an additional forward swing to the leg, and thereby not only assisting the horse, but improving his gait. Also the action of the spring being uniform has a tendency to equalize the step and gait of the animal. The drawing out on the spring G taking place, as it does, with the downward movement of the leg, requires substantially no additional power from the animal, but it is accomplished by the gravity of the limb and, in fact, has the effect of alleviating or cushioning the concussion of such downward movement of the limb.

What I claim as my invention, and desire to secure by Letters Patent of the United States, is—

1. The combination of the springs G—G suitably attached to the vehicle, guide pulleys suitably supported from said vehicle at the front of the animal, and cords H attached at one end to said springs, supported intermediately on said pulleys, and attached at their opposite ends to the front limbs of the animal; substantially as shown, and for the purpose described.

2. The combination of the thills A, the coiled springs G suitably supported thereon, cords H attached thereto and adapted to draw against the resiliency of said springs, forward pulleys supported on said thills supporting the cord H, and the boots L seated on the animal's fore legs and attached, respectively, to the forward ends of the cords H; substantially as shown, and for the purpose described.

3. The combination of thills A, a frame B, adjustably attached thereto, spring cord pulleys carried on said frame in advance of the animal's fore legs, and spring cords attached at one end to the fore legs of the animal, passed intermediately over said pulleys, respectively, and suitably attached at their opposite ends to said frame, substantially as shown and for the purpose specified.

In testimony whereof I affix my signature in presence of two witnesses.

CHARLES L. PASSMORE.

Witnesses:
JOHN G. MANAHAN,
WILLIAM SMITH.